United States Patent [19]
Newman et al.

[11] Patent Number: 5,844,824
[45] Date of Patent: Dec. 1, 1998

[54] HANDS-FREE, PORTABLE COMPUTER AND SYSTEM

[75] Inventors: Edward G. Newman, Fairfax Station; Michael D. Jenkins, Manassas; Steven J. Schwartz, Fairfax, all of Va.

[73] Assignee: Xybernaut Corporation, Fairfax, Va.

[21] Appl. No.: 861,598

[22] Filed: May 22, 1997

Related U.S. Application Data

[63] Continuation of Ser. No. 538,194, Oct. 2, 1995, abandoned.

[51] Int. Cl.⁶ .................................. G06F 1/00; G06F 3/00
[52] U.S. Cl. .................................... 364/708.1; 364/709.11
[58] Field of Search ............................ 364/708.1, 705.05, 364/709.11; 434/258; 128/731; 351/210

[56] References Cited

U.S. PATENT DOCUMENTS

| | | | |
|---|---|---|---|
| 4,013,068 | 3/1977 | Settle et al. | 600/545 |
| 4,973,149 | 11/1990 | Hutchinson | 351/210 |
| 5,189,632 | 2/1993 | Paajanen et al. | 364/705.05 |
| 5,305,244 | 4/1994 | Newman et al. | 364/708.1 |
| 5,374,193 | 12/1994 | Trachtman | 434/258 |
| 5,426,769 | 6/1995 | Pawloski | 395/500 |
| 5,513,649 | 5/1996 | Gevins et al. | 128/731 |
| 5,584,010 | 12/1996 | Kawai et al. | 711/117 |
| 5,630,153 | 5/1997 | Intrater et al. | 395/800.35 |
| 5,649,061 | 7/1997 | Smyth | 395/20 |

*Primary Examiner*—Emmanuel L. Moise
*Attorney, Agent, or Firm*—James J. Ralabate

[57] ABSTRACT

The invention involves a body-worn, hands-free computer system. The system does not rely upon a keyboard input or activation apparatus but rather has various activation means all of which are hands-free. The system can be used with other systems, other system components and communication apparatus. Also, various components of the present system can be body worn or placed in a disconnected location if desired.

18 Claims, 3 Drawing Sheets

HANDS-FREE, PORTABLE COMPUTER AND SYSTEM

This invention relates to portable computers and, more particularly, to a mobile computer and to a variety of activation means and communication systems that can be set up using hands-free, portable network components. This application is a continuation of U.S. patent application Ser. No. 08/538,194 filed on Oct. 2, 1995, now abandoned.

BACKGROUND OF THE INVENTION

In U.S. Pat. No. 5,305,244 (Newman et al) owned by the same entity as the present invention, a voice-activated, user-supported computer (mobile computer) is disclosed and claimed. In the system of U.S. Pat. No. 5,305,244, a lightweight, self-contained, portable computer is defined which is completely supported by a user for hands-free retrieval and display of information. This compact computing apparatus comprises a computer housing having means to secure the housing to a user and storage means mounted in the housing for storing previously entered information including a pre-programmed vocabulary model of words and phrases. Also included in Newman et al is a description of further components such as: processor means for receiving, retrieving and processing information and user audio commands in accordance with a stored program and audio transducer and converter means in communication with the processor means for receiving and converting the received audio commands into electrical signals and sending these converted signals to the processor means. The processor means will thereby recognize a command, match these commands against a defined subset of a pre-programmed vocabulary and transmit this to a computer display means. The display means is mounted adjacent the user's eyes to provide the user complete hands-free use of the portable computer. The components and their function are fully described in this U.S. Pat. No. 5,305,244, the disclosure of which is fully incorporated into this disclosure by reference. For the sake of clarity, each of the components of the apparatus of U.S. Pat. No. 5,305,244 will not be described in detail herein since they are now known as per the invention described in U.S. Pat. No. 5,305,244. This U.S. Pat. No. 5,305,244 will be designated throughout this disclosure as Newman et al I.

Various major modifications may be made in the apparatus of U.S. Pat. No. 5,305,244 to further enhance its use and versatility.

SUMMARY OF THE INVENTION

Today, many printed publications, particularly technical manuals, are being replaced by electronic technical manuals (ETM) and interactive electronic technical manuals (IETM). Such ETMs and IETMs are essentially electronic databases which are typically housed in conventional computers having a keyboard for user input and a full-sized monitor for information display. An operator may use the computer in order to access and display data stored in the ETMs and IETMs for a variety of uses including troubleshooting and repair/replacement of a system, subsystem or component thereof.

ETMs and IETMs are particularly useful in service and repair industries wherein technicians often require detailed information from technical manuals to repair and service malfunctioning devices. For example, ETMs and IETMs are useful in automobile repair centers wherein service personnel find it necessary to access information in automobile technical manuals in order to service malfunctioning automobiles. Additionally, ETMs and IETMs are useful in military service centers wherein military technicians often require access to information in military technical manuals to service and repair malfunctioning weapon systems. In such scenarios, it is more efficient to access information from ETMs and IETMs rather than printed publications since the printed publications may be voluminous.

As noted above, ETMs and IETMs are traditionally stored in and accessed from conventional computers having keyboards for operator input and full-sized video monitors for displaying data. Such computers are often located in service areas adjacent to the devices being repaired. In operation, maintenance personnel move back and forth between the computers and the devices being repaired in order to retrieve data required to service the devices being repaired. Such movement between the computers and the devices being repaired represents a considerable amount of time and effort spent for the purpose of retrieving data from the ETMs and IETMs. Therefore, conventional Computers are not efficient devices for storing ETMs and IETMs since such conventional computers result in inefficient data delivery of the information in the ETMs and IETMs to operators.

The present invention is directed to a compact, self-contained portable computing apparatus at least part of which is completely supported by a user for hands-free retrieval and display of information for the user. The computing apparatus includes a housing which may or may not have securing means for removably securing the housing to a user for support by the user. Alternatively, the housing may be located in a remote location not attached to the user and apart from the other components. The housing further includes storage means for storing previously entered information, and processor means, communicating with the storage means, for receiving, retrieving and processing information and user commands in accordance with a stored program. Since large databases of ETMs and IETMs will be accessed by the mobile self-contained computing apparatus, a means of easily interfacing storage means containing the databases is required. The housing of the computing apparatus includes an access port whereby various storage means containing data can be interfaced and communication established. Access and transfer of data between the storage means and the computing apparatus can be accomplished entirely under control of various hands-free activation means described in this application. The access port allows direct electrical attachment of the storage means;, however, other wired and wireless connections are also used. The computing apparatus also includes eye tracking, brain actuation means, transducer and converter means with or without audio transducer and converter means in communication with the processor means, for receiving commands from the user, for converting the received commands into electrical signals, for recognizing the converted electrical signals, and for sending the recognized electrical signals to the processor means. The transducer and converter means may or may not be supported by the user. The computing apparatus further includes display means in communication with the processor means for receiving information from the processor means and for displaying the received information for the user, the display means being supported by the user whereby the user may operate the computing apparatus to display information in a hands-free manner utilizing only brain activation or eye tracking with or without audio commands.

In addition to the voice activation means used in Newman et al I as noted earlier, these two other above-noted activation means have been contemplated by the present invention, i.e. eye-tracking and brain-activation means (EEG). Using the same general system described in Newman et al I, voice activation may be fully or partially replaced by or used with either eye-tracking means and/or by Brain Actuated technology means. In some situations, any combination of voice activation means, eye-tracking activation means and brain-actuation means may be desirable in a Newman et al I type portable, hands-free computer system. In combination with the above activation means some computing environments may utilize head and arm tracking means; for example, such an environment could be a virtual reality application.

The system concept of eye-tracking permits the operator to manipulate the computer completely hands-free by tracking the eye and interpreting its movements as "mouse" commands to the application. Generally, the eye-tracking system is head-mounted on the user but may be used in any suitable manner. As with audio commands, eye-tracking can be used hands-free and can be designed to be completely private or customized. As noted earlier, the eye-tracking system can be the only commanding system used with the present computer or it can be used, as above noted, with the voice audio command system described in Newman et al I or with brain-actuated means. The eyetracker interface used in the present invention can be any suitable eye-tracking system such as the system described in the publication "A New 'Look'", OEM Magazine, May 1995 issue.

The principle of eye-tracking with a computer is relatively uncomplicated. The operator's eye is tracked by an automatic video tracker. The positions of the eye center and the center of the pupil are calculated separately. These two points determine a line which passes through the computer display at the point where the operator is looking. With this location data, the eye can give information to the computer just as the conventional mouse does. The eye-driven cursor is, in effect, a visual mouse. A more detailed explanation of eye-tracking is described in the above Foster-Miller Inc. publication and the U.S. patent above cited, both of which are incorporated into this disclosure by reference.

When eye-tracking is used with an audio command system (as in Newman et al I) each system can be used independent of the other or can be used to enhance and supplement the other. Thus, a voice command can be given the present computer which is confirmed or enhanced by the present eye-tracking system and vice versa. Also, in the event of failure of one of the command systems, the other can be put into play to ensure computer performance.

The following is taken in part from the above-cited Foster-Miller Inc. publication which is included by reference in the present disclosure and which further defines an eye-tracking system usable in the present invention.

The ongoing explosion of computer technology has not enhanced the user's ability to interactively process large amounts of information. While we improve computational speed, memory size, sensor performance, and software capability, the human interface receives less attention. Input devices have remained essentially unchanged for a decade. The area is ripe for ergonomic improvement with state-of-the-art technology.

Eye-directed control has potential for military and commercial application wherever trackball and joystick inputs are needed for difficult man-machine interface tasks. Eye-tracking also reduces the need for specialized hand-eye coordination skills. Eye-tracking has already found many applications in both military and commercial systems.

The eye's ability to rapidly shift line of gaze in a changing visual environment makes it an ideal computer input device.

Over the last 25 years, techniques have been developed to monitor eye position. Until now, no one has attempted tracked eye movement as an interface device. Foster-Miller has developed a system which overcomes these limitations and makes possible an eye-driven cursor or "visual mouse".

Recently demonstrated was a prototype of this computer interface for the Navy at the Naval Surface Warfare Center, Dahlgren, Va. With this interface, an operator selects an item in the computer display just by looking at it. This program aims to replace the trackball interface now used in the AEGIS workstation with an eye-tracker interface which is faster, less fatiguing and more precise.

The "Visual Trackball" is simple in principle. One of the operator's eyes is acquired and tracked by an Automatic Video Tracker. The positions of the eye center and the center of the pupil are calculated separately. These two points in space determine a line which passes through the computer display at the point where the operator is looking. With this location data, the eye can give information to the computer just as a mouse does.

The operator calibrates the tracker by looking at benchmark points on the display screen. This allows each operator to choose a comfortable position, distance from the display and head and neck attitude. The calibration data is used to correct the constants in the equations used to calculate the point of regard on the display.

When calibration is complete, the head is free to move. The normal small movements of an operator who has chosen a comfortable position have negligible effect on the "Visual Trackball's" accuracy. Blinking does not make the tracker lose lock. If lock is lost (when the operator looks away from the display for a moment, for example) tracking stops and the camera freezes. When the operator comes back to the display, the camera is ready to reacquire the eye in the same place where it was lost.

In order to calculate the "line of gaze" or the line in space along which the operator's eye is looking, the eye and the pupil of the eye are tracked separately. The eye is tracked in space using the reflection of an IR reference light off the cornea as an indication of the position of the eye center. Since the cornea is approximately spherical, the position of the reference is relatively insensitive to eye rotation. The position of the pupil center relative to the eye center, therefore, can always be calculated and the positions of these two points related to the line of gaze. Pupil-corneal reflection difference measurements are nearly linear over +/−15 degree of visual angle. Larger eye movements are handled by more complicated calculations.

The basic system is simple. A standard low light CCD images the eye illuminated by an IR source. The first Purkinje image, or corneal reflection, is formed by this illuminator. The pupil is tracked as a dark image since with the IR source off the axis of the detector, it is an IR sink. Placing of the illuminator is not critical for calculation and the quality of the reference reflection on the eye can be optimized;" this ends the quote from the Foster-Miller publication.

The advantages in using eye-tracking in the present invention are several; i.e. simplicity and speed are primary considerations. It is much faster to use your eye rather than have to hand manipulate a keyboard or other tracking and activating devices.

In brain-actuated technology or brain-actuated control such as EEG with or without muscle movement detection, a relatively new and recent technology is considered as the activation means or as an activation means in the system of Newman et al I. Brain-actuated technology, EEG, is described in detail in "Science Times", *New York Times*, Mar. 7, 1995 which is incorporated herein by reference. The headset used can have the necessary electrodes required in EEG together with the microphone for voice activation, if desirable. The display means for receiving system information and displaying the received information is also positioned on the headset of this system. This new system of brain-actuated technology is called electroencephalography, but will be understandably referred to herein as "EEG". It has been demonstrated, for example, by the New York State Department of Health that it is possible for a person using brain wave control alone to move a computer cursor around a display screen. Electrodes positioned in contact with a human head detect emitted electromagnetic signals from the brain which are passed on to an amplifier which transmits these signals to a processor. This EEG process has been developed to the point where users could even carry on conversations while performing brain-actuated tasks. As noted in the above-noted *New York Times* article "Science Times" noted "Despite the bewildering complexity of brain wave patterns, however, laboratories in the United States and Europe have shown unequivocally that by conscious effort a person can control some brain emissions, and with training can use this control in ways that nature never achieved". This article goes on to say "Somehow, a brain can train itself to exploit this two-channel computer algorithm, or method to move a cursor. . . . Amazingly, an average person can quite quickly learn to do this and move a cursor around etc." In conclusion, this *New York Times* article states "Progress will come on two fronts . . . "; improving the computer algorithms that must be refined to look for useful brain signals, and improving the training of subjects to exploit those signals as direct channels of communication, channels that are independent of the body's normal sensory or motor apparatus. Again, quoting from the Mar. 7, 1995 *New York Times* article in describing the general EEG procedure. "A pair of electrodes is placed over the left hemisphere of the brain and another pair is placed over the right. The brain emits very minute electrical signals called electroencephalography activity, or EEG.

The electrodes register these signals and feed them to a computer program that isolates and measures certain waves. Using a mathematical formula designed by the researchers, the computer decides how to move the cursor. A cursor appears in the center of the video screen and a target appears in one of the four corners. The subject tries to move the cursor to the target. Subjects have reported that, initially, they concentrated on movements like running, floating, shooting baskets or just relaxing. But once the skill was developed, the subjects said it could be accomplished without thinking about it, much like walking. When the cursor touches the target, the target flashes and the computer registers a hit. If the cursor reaches a non-target point on the perimeter of the screen instead, the computer registers a miss. At present, well-trained subjects can hit the target 70 percent of the time. The trial lasts about two seconds and is followed by a brief pause and then another trial. Each set of trials lasts two or three minutes, separated by one-minute breaks." In addition to this Mar. 7, 1995 *New York Times* article "Science Times" which is, as noted above, incorporated into this disclosure by reference, EEG is the subject matter of a pending U.S. Patent Application filed by inventor, Andrew M. Junker.

In addition to EEG signals, electrical signals emanating from head muscles are also amplified and converted to control signals in a similar manner. The EEG signals and muscle signals are controlled by the user to command the computing apparatus.

The use of some of the portable components of the present apparatus with a remote host computer is also a possible embodiment. Since the computer component (106 of FIG. 1) of Newman et al I is the heaviest component, an embodiment of the present invention includes using only the: (a) activation means (voice, eye tracking, brain-activation and/or other activation means), (b) headset with the display in electrical communication with a processor means for receiving the outputted information from the processor and for displaying the received information for the user, and (c) a communication means such as a transceiver utilizing radiofrequency, dispersed or directed infrared, ultrasonic of other modulated carrier waves for transmission of information between the activation means and the host computer and accepting return information from the host computer. The remote computer can be in contact with several users concurrently each having activation means, headset with display means, and communication means to interact with the host computer. Therefore, in this second mode, it is possible, for example, to permit several users with headsets to function off one portable mobile host computer carried by one of several users either working together or at remote locations. Another embodiment incorporates the processor and communication means within the housing of the display means. Head and arm tracking can also be used in conjunction with the aforementioned activating means. Head and arm tracking is primarily used to indicate to the computer the position of the head and one or more arms or legs if required, relative to a computer display which contains representations of the user's appendages. This is frequently used in virtual reality applications in which the user is represented in the display or can affect the display by appendage movements. These appendage tracking signals reflect appendage position and affect the computer program and display as though the user is a part of the programmed events. Articles describing use and design of head and arm tracking devices can be found in magazines such as *Virtual Reality-Special Report*, Winter 1994, Vol 1, Number 4. In this report, head and arm tracking are described in the article "Is Virtual Reality a Good Teaching Tool?" on page 51. In addition, tracking devices of the type used in this embodiment can be obtained from Exos Inc., 2A Gill St., Woburn, Mass. and other suppliers as listed in *The Virtual Reality Resource Guide* of the above publication. Examples are, the Exos "Force Arm Master" and the Exos "Position ArmMaster". The Position ArmMaster is advertised as "A transducer of human arm motions that provides commands to the slave or simulation and can be used to record human motions". Essentially, head and arm tracking devices contain transducers that provide signals relative to the position of the head and the arm vertically and horizontally relative to predetermined planes of reference. The planes are three-dimensional and describe a point in space relative to the person wearing the tracking devices and a point in space relative to a computer simulation. These transducers are coupled to circuits for receiving and interpreting the transducer signals such as are available from DigiSonic, Inc., P.O. Box 407, Old Greenwich, Conn. The use of such technology along with a body worn voice, eye tracking, or brain actuated computer presents a new environment for computing that will be revolutionary for present and future applications. Components to accomplish head and arm tracking are available to the technician and are currently in use for games and virtual reality equipment.

In the modes described above, the system would work as follows:

In the first mode, a user having a headset with activation means, a display screen and communication means is linked with a host computer either worn on the user's person contained within the display means or remote from the person. The user would command the host computer to display a particular procedure for repairing a piece of equipment. The host computer would then search for and transmit the procedure back to the user for display on the user's headset.

In the second mode, a host computer could also be responsive to several users having headsets that may be working as a team to repair the piece of equipment. The users could all work from the same procedure or call for a different procedure to be displayed as an additional window in the display. In this manner team members can also use the system as a communication means between team members as a form of intercommunications as well as a means to compare findings using the graphic display capabilities of the system. It may be that information required by the team is contained in several host computers. The communication means in each headset is then configured and tuned so that several hosts can be made available to each headset as well as several headsets operating into one host.

Obviously, the present system will function with components of several mobile computing apparatus interacting with each other. As in examples above, the headset of one mobile computer can receive displays from other mobile sets or can digitize the activating means of another mobile computer.

A further feature of an embodiment of the present invention utilizes an adapter used in each mobile computer to permit the use therein of cellular or hardwire telephone communication. In place of the cellular telephone communication means, a radiofrequency, infrared, laser or fiberoptic transceiver or other communication means may be used. These will generally be referred to in this disclosure as "communication means". Communication means can be accessed through the host computer or by using the headset with its built-in communication capability. Thus, communication can be between headsets, headsets and host computers and between host computers activated by headsets as the control devices. A scenario of operation would be with a team of users repairing a tank. The host computer unit is positioned on the belt of the team leader. The other team members activate the host computer using their headsets. One team member requires information stored on a host computer located back at the maintenance shop two miles from the repair site. This team member acquires the remote host computer at the maintenance shop using this headset communication means and a cellular telephone link. The information required is referenced and viewed on his headset. After obtaining the correct reference material, it is downloaded to the repair site host for other team members to utilize by viewing it in their headsets. Thus, local as well as remote hosts can be activated by team members' headsets. Information can then be obtained from remote hosts and downloaded to the local host computer.

Team members can communicate among themselves using headset-to-headset communication links and to host computers as required. Local communications can use varied means of linking headsets to host and headset to headset. Dispersed infrared is useful as a medium for local linking because of eavesdropping security potential, bandpass width, low component cost and communication reliability.

The following are various embodiments that may be used when the hands-free computer of the present invention is used having all components in the headset portion of the apparatus:

A. Wireless Headset to Host Computer—A user attempting repair of a complex machine such as an aircraft is equipped with a Mobile Assistant™ having a wireless communication link with a computer portion of the Mobile Assistant™. The user is wearing the computer unit on a waist belt and wearing a headset unit. The lack of wiring between the headset and belt-worn computer allows free movement of the user's head and arms without regard for tangling wires or snagging them on nearby objects. During the repair the user must crawl into a small opening. At this point, the user removes the computer unit and places it outside the small opening before attempting to wiggle into the opening. Since the headset to host communication is wireless communication, control of the host computer is still possible. The user would issue voice commands to the host computer or position the cursor and evoke commands with an eye tracking eyepiece.

B. Wireless Several Headsets to a Host Computer—A team of maintenance personnel are performing maintenance checks on an aircraft. Each member of the team is equipped with a Mobile Assistant™ headset having wireless communication linkage to a Mobile Assistant host computer worn on the waist of the team leader. Each member of the team is able to communicate and activate various functions of the host computer. If different data is required by various members of the team, each would utilize a separate presentation window for their data. In addition, each headset has circuitry that allows communication between headsets for intercommunications. This is accomplished by switching to that mode using voice commands or by activating proper icons on the user's headset display using eye tracking capabilities as installed in the headset.

C. Wireless Communication to Other Hosts Remote From the Team Location—Continuing the above scenario, a member of the maintenance team above requires data located on a computer remote from the team location. The remote computer is displaced geographically from the maintenance team location. This displacement could be several miles or several thousand miles from the team location. Options for that team member are:

Radiofrequency—Link with the remote host computer using wireless radiofrequency communications between the headset of the team member and the team host computer to the remote host computer and return data back through the team computer then to the headset of the requesting team member. All members of the maintenance team could receive the return data from the remote computer or by using discrete user headset addressing, limit the return data to the requesting headset. This is accomplished using radiofrequency transceivers communicating between the host and remote modems. In practice, the radiofrequency transceivers would use packet modems for the data transmission between the host and remote computers. In digital radiofrequency wireless communications, packet transmission is used to assure reliability of data transfer by error checking and retransmission since interference and fading are common problems in radiofrequency data transfer.

D. Cellular Telephone—Another option would be to use a cellular telephone link between the local host computer and a remote computer. The maintenance team member requiring the remote data uses a wireless headset to link with the local team host computer. This is accomplished by the maintenance team member using a wireless headset and voice or eye tracking activation means to dial a local cellular telephone through a digital data-to-telephone modem at the local host computer. This establishes a telephone link with the required remote computer. The link then uses commercial telephone lines to contact the required remote computer at its hardwired or cellular telephone number (local or long distance). The remote computer using its digital data-to-telephone modem establishes a modem to modem connection with the local host computer and data transmission is active. The local maintenance team member using the wireless headset can now request digital data from the remote computer.

Other transmission means—Other options for communicating with a remote computer could include laser or other communication methods that would have the required range and reliability for data transfer. The scenarios for such linkages would be similar to the above.

It is obvious that all communications between Mobile Assistant™ (a trademark of Computer Products & Services, Inc. of Fairfax, Va.) components using various wireless means could also be conducted using hardwire or fiberoptic connections.

This communication means would be extremely helpful to the user to order parts or convey other information while using the mobile computer of this invention. Thus, the user does not need to detach him or herself from the mobile computer to call a parts supplier or consultant to assist at the task at hand. This type of communication hookup may be accomplished as follows.

The computer apparatus of this invention may be interfaced with a telephone system in such a way as to provide hands-free telephone communication between multiple persons and/or computers. One or more of these may be performing telephone communications by using the present computer apparatus. As earlier noted, communications may include but are not limited to: voice, data, including interrogation and control of built-in test codes, video images and sounds. Operation may be hands-free using the voice-activated feature of the present computer apparatus, manually-activated using a keypad or a combination of both.

Telephone systems that may be interfaced include but are not limited to: RJ-11 wall jacks commonly found in homes and small businesses, multiple line telephone switching systems found in medium and large businesses, cellular communications, radio frequency communications interfaces and cordless accessories to any of the above.

The basic system incorporates the apparatus of this invention, i.e. hands-free body-worn computer with voice activation and a head-mounted display, a telephone system and a unique electronic interface between the two that integrates both traditional analog voice signals and computer data between the two components.

Integration of private as well as public telephone communications into this system is accomplished using a voice/data modem (modulator/demodulator) as now used with existing computing systems. The modem is either built-in to the host computer or it can be inserted as a "PCMCIA" or "PC Card" into the host computer. In addition, communication means in the headset can also utilize a built-in modem to interface through communications means to a remote device. Using the communication means of the system, data and voice can be transmitted and received between headsets and mobile systems as well as between mobile systems.

Communicating wide-band, timing sensitive data such as computer graphic images still or motion active video may utilize a more narrow band communication system such as cellular radio or hard wire systems. Such systems can operate using multiple channels, data compression or both which will enable transmission of the above-mentioned data at real time speeds. The host computer will be used to communicate with another computer at a remote location. Each computer will serve users having headsets that will display data and images and serve as activating devices to control the host computers. For example, if cellular telephones are used as a wireless communication means, the computer would access the telephone number of a remote host computer, cellular or otherwise, and establish a connection. When data transmission between host computers is required, the user switches to data mode through a voice/data modem installed in the local host computer to establish data transmission. The dialing and, switching sequences can be controlled by voice or other activation means by the host operator. This allows for the passing of voice input signals from the apparatus of this invention through to the telephone system while maintaining voice-activated computer control of the host through the telephone system. This interface may be integrated within the computer apparatus of this invention, attached to it during manufacture or user installed. This approach provides seamless switching between voice and data transmission and reception between one or more distant locations without distracting from the task being performed by the individual using the computer apparatus of the present invention.

It goes without saying that the mobile computer of this invention may be interfaced with or used in connection with any desired computer local networks such as Novel, Banyan or Arcnet or wide area networks such as "Internet" or the like.

This allows for the passing of voice input signals from the apparatus of this invention through to the telephone system while maintaining voice-activated computer control of the telephone system. The interface may be integrated within the computer apparatus of this invention, attached to it during manufacture or user installed. This approach provides seamless switching between voice and data transmission and reception between one or more distant locations without distracting from the task being performed by the individual using the computer apparatus of the present invention.

When using the hands-free computer apparatus of this invention with a communication interface (such as a cellular phone), the following components are used:

Major components considered for communication interfaces:
  Headsets—containing communication interface capabilities.
    Components: Headband Unit
      Display Screen
      Transducer and converter containing microphone and conversion/ transceiving means
  Computer Unit—known also as host computer; may also be totally integrated with headset housing.

Configurations:
  First Mode—wireless headset to host computer
  Second Mode—wireless several headsets to host computer
  Other Modes—several hosts to each headset to headset communication-(primarily, but not limited to voice since data may be transmitted on the voice channel using a built-in modem within the headset electronics.)
  Local—wireless link to another headset
  Remote through
    Wireless transmission—cellular phone to telco system back to cellular phone then to another headset
  Host to Host communication
    Wireless local transmission wireless link to another local host (local is defined as in the immediate geographical area—for low power communications Remote wireless transmission-(remote is defined as outside the immediate geographical area requiring higher power communications or a backbone system.

It is obvious that all communications that are conducted using wireless means could also be conducted using hardwire or fiberoptic or other suitable connections.

Various workable embodiments are:

Wireless Modes:
    Headset to Host (Local)
    Headset to Host (Remote)
    Headset to Headset (Local)
    Headset to Headset (Remote)

Wireless Transmission Means
    Radiofrequency
        radio link
        spread spectrum
        cellular telephone link
    Infrared link
        directed or not dispersed
        dispersed or omnidirectional
    Underwater Link
        Radiofrequency
        Sonic
        Infrared
    Light Frequency Link
        Visible
        Invisible Another embodiment would utilize the hands-free body-worn computer of this invention in a medical role. A patient using the computer would be able to control medical devices by using one of the hands-free activating means to command the computer to control medical devices such as nerve stimulators to exercise muscles (as to prevent atrophy). Other uses are to control systems to allow patients with spinal cord injuries to activate muscles and enable movement as complex as walking. Current equipment that allows walking control of muscles involves bulky computers and pre-programmed commands. With this invention in a hands-free control environment, even more complex activities can be commanded at the will of a patient.

DETAILED DESCRIPTION OF THE DRAWINGS AND PREFERRED EMBODIMENTS

Figure 1:
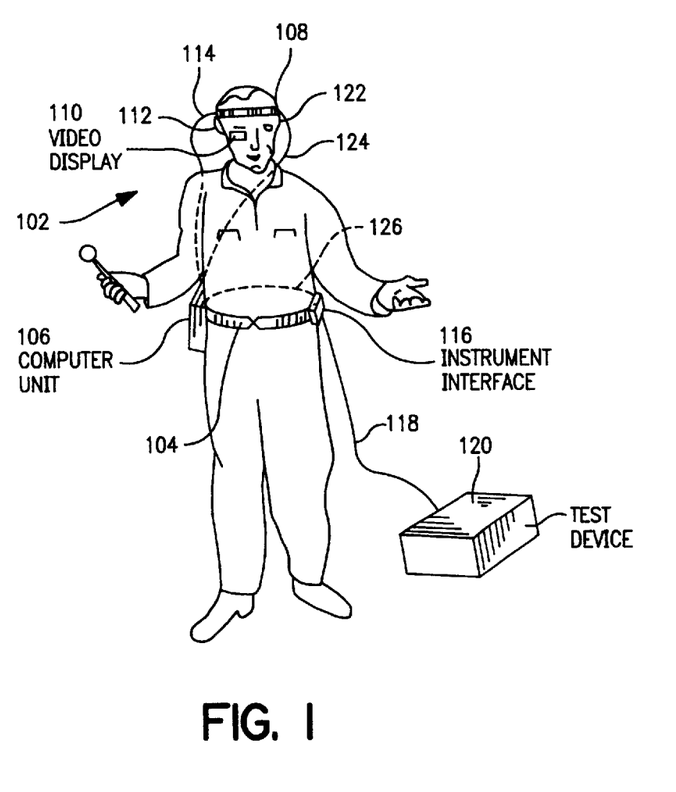
FIG. 1 is a schematic front view of a user wearing the mobile computer of the present invention.

In FIG. 1 a schematic diagram is presented of the components and features of the mobile computer 102 of this invention as it is worn by a user. The computer 102 includes a housing such as system unit 106 having a securing means, in the present embodiment a strap or belt 104 which is worn around the uses waist for securing the system unit or housing 106. The computer 102 further includes display means for receiving information from the system unit 106 and for displaying the received information for the user or operator. The display means, in the present embodiment, includes a headband 108, a display screen 110, and an adjustable arm 112 connecting the display screen 110 to the headband 108. The headband 108 is adapted to be worn by the user in any convenient location, but preferably upon the user's forehead, as shown. The position of the display screen 110 may be adjusted via the adjustable arm 112 so that the operator can comfortably view information displayed on the display screen 110. The display screen 110 is electrically connected to the system unit 106, in the present embodiment, via a cable 114, although other connection means may alternatively be employed.

The computer 102 further includes transducer and converter means in communication with the system unit 106 for receiving activating (from audio, eye-tracking or EEG) commands from the user, for converting the receiver commands into electrical signals, for recognizing the converted electrical signals and for sending the recognized electrical signals to a processor within the system unit 106. In the present embodiment, the transducer and converter means includes a microphone 122 for receiving verbal commands from the operator (or eye-tracking means as above described or EEG means as above defined). The microphone (or eye-tracking means as above described or EEG means as above defined) 122, in the present embodiment, is electrically-connected to the system unit 106 via a cable 124, although those with ordinary skill in the art will appreciate that any input or transducer device could be used and that the input or transducer could be supported by the user at some other location.

The computer 102, in the present embodiment, further includes measurement means in communication with the system unit 106 for performing electrical measurements on devices being evaluated by the computer 102 (such evaluation including, but not limited to, testing, calibrating, troubleshooting, diagnosing and servicing). In the present embodiment, the measurement means includes an instrument pack 116 which is attachable to the belt 104 and is electrically connectable via cables 118 to a device 120 which is to be tested, analyzed, repaired or the like. The instrument pack 116 is also electrically-connected to system unit 106, in the present embodiment, via a cable 126. While the present invention is illustrated in FIG. 1 with reference to an audio activation means, it should be understood that eye-tracking actuation means or EEG can be easily substituted therefor as described earlier. Thus, microphone 122 in FIG. 2 is intended to include eye-tracking means or EEG which can easily be used by those skilled in the art.

Figure 2:
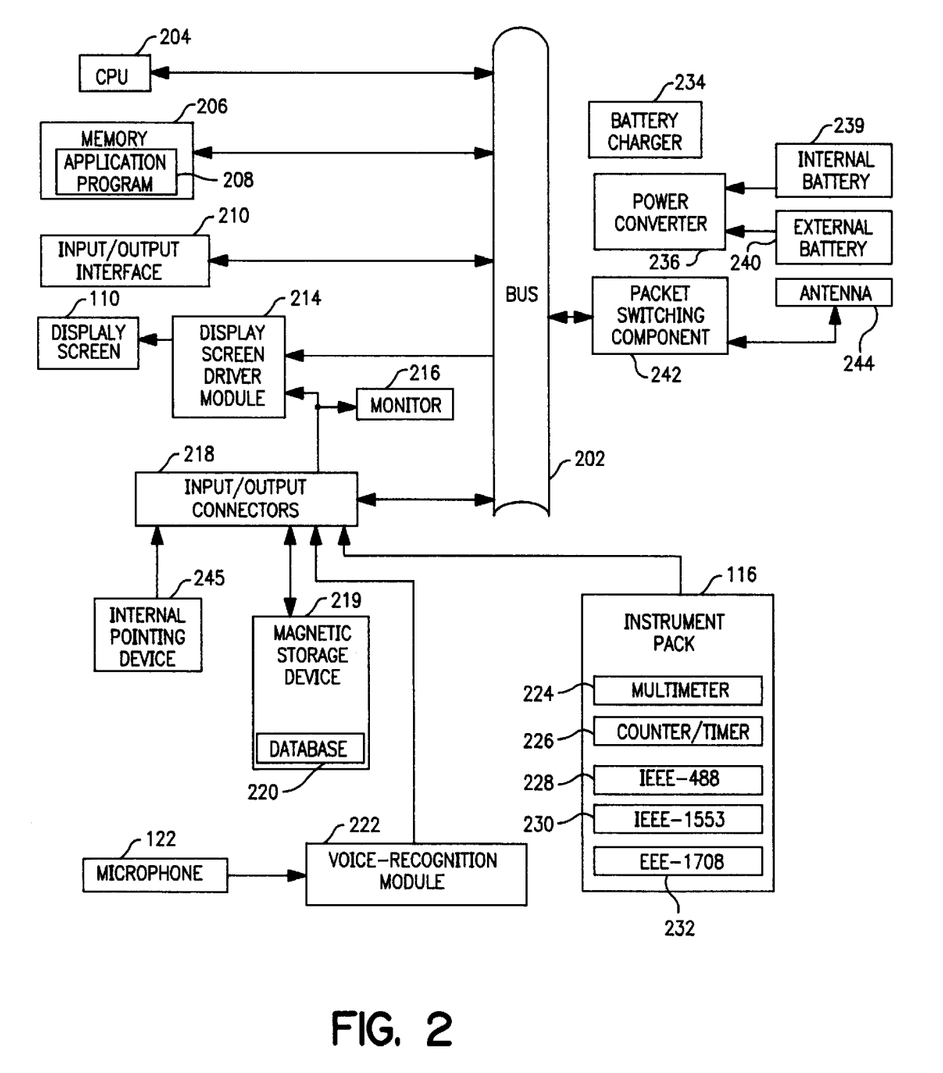
FIG. 2 is a schematic block diagram of the mobile computer of this invention designating any of the voice, eye-tracking, EEG or mixtures thereof as the "activation means".

FIG. 2 is a schematic block diagram of the primary structural features of the computer 102 in accordance with the present embodiment. The computer 102 includes a bus 202, which preferably has a data width of at least sixteen bits. According to the present embodiment, the bus 202 is contained in the system unit 106. The computer 102 also includes processor means such as central processing unit (CPU) 204, which is connected to the bus 202 and is also preferably contained in the system unit 106. Preferably, the CPU 204 is a 16, 32, or 64 bit microprocessor such as available from Intel. It will be appreciated by those of ordinary skill in the art that while an Intel 80386 or faster microprocessor is preferred, any other central processor or microprocessor, either available presently or in the future, could be used.

The computer 102 also includes a memory 206 having, for example, up to thousands of Mbytes of random access memory (RAM). The memory 206 which is connected to the bus 202 is composed of solid state and magnetic storage devices and is preferably contained in the system unit 106.

The memory 206 stores an application program 208 as well as other data while the computer is operating.

The application program 208 may have been loaded into the memory 206 from a magnetic storage device 219 (described below) pursuant to operator instructions.

The computer 102 also includes an input/output interface 210 which controls all data transfers between the CPU 204 and certain other components (herein called peripherals) which communicate with the CPU 204 but which are not connected directly to the bus 202. Preferably, the input/output interface 210 includes a video interface, a controller for at least two RS-232 compatible serial ports, a controller for the centronics-compatible parallel port, keyboard and mouse controllers, a floppy disk controller, and a hard drive interface. However, it will be appreciated by those of ordinary skill in the art that the input/output interface 210 could include additional and/or different interfaces and controllers for use with other types of peripherals such as Ethernet®, Arcnet®, token ring interface. The input/output interface 210 is connected to the bus 202 and preferably is located in the system unit 106.

The computer 102 also includes input/output connectors 218 which collectively represent the above-described physical peripheral ports and accompanying electrical circuitry. However, those of ordinary skill in the art will appreciate that the input/output connectors 518 could include additional and/or different types of physical ports.

The computer 102 also includes a power converter 236 which is connected to an internal battery 239, an external battery 240 and/or an AC power source such as a conventional electrical outlet. The power converter 236 and the internal battery 239 are preferably located in the system unit 106 while the external battery 240 is located outside of the system unit 106, preferably attached to the belt 104. The external battery 240 is connected to the power converter 236 via the external power supply port. When the computer 102 is used in a "desk-top" mode (e.g. non-portable mode), the power converter 236 may be connected to the AC power source for supplying regulated DC power to the computer 102. When the computer 102 is used in a portable mode, the power converter 236 is usually connected to the internal battery 239 and/or the external battery 240 for supplying regulated DC power to the computer 102. Preferably, the internal battery 239 supplies power to the power converter 236 (and ultimately the computer 102) only when the power converter 236 is not connected to either the external battery 240 or the AC power source. The computer 102 further includes a separate battery charger 234 for periodically charging the internal battery 239 and the external battery 240 when not in use. The computer 102 may include a battery-powered indicator, attached to the system unit 106 for indicating when the power levels of the external battery 240 and/or internal battery 239 are low.

Preferably, the bus 202, CPU 204, memory 206, input/output interface 210, input/output connectors 218, and power converter 236 described above are implemented using a backplane circuit card, processor circuit card, memory circuit card, input/output circuit card, and input/output connection circuit card in a manner well known to those skilled in the art. The processor circuit card, memory circuit card, input/output circuit card, and input/output connection circuit card are plugged into the backplane circuit card. Preferably, IBM PC/AT compatible and/or 80386 compatible circuit cards available from Dover Electronics Manufacturing of Longmont, Colo. and Ampro Computers of Sunnyvale, Calif. are used. The circuit cards from Dover Electronics Manufacturing occupy a cubic space of approximately two inches by five inches by two inches while each of the circuit cards from Ampro are approximately 3.8 inches by 3.6 inches. However, those having ordinary skill in the art will appreciate that any functionally compatible circuits cards which conform to the relatively small size of the system unit 106 could be used in place of the circuit cards available from Dover Electronics Manufacturing.

The computer 102 also includes display means which, in the present embodiment as noted above with reference to FIG. 1, includes a headband 108, a display screen 110, and an adjustable arm 112 connecting the display screen 110 to the headband 108. As shown in FIG. 2, the display means further includes a display screen driver module 214 which preferably is located in the system unit 106, but which alternatively could be located outside of the system unit 106 adjacent to the display screen 110. The display screen drive module 214 converts display information (that is, information which is to be displayed for an operator) received from the CPU 204 (via the input/output interface 210, bus 202 and input/output connectors 218) into video signals which are sent to and compatible with the display screen 110. The display screen driver module 214 is of a standard design well known to those skilled in the art.

Activation means 122 and module 222 can be audio, eye-tracking or EEG means or a mixture thereof.

Preferably, the display screen 110 is a miniature monitor called an "eye piece monitor" which provides a display equivalent to conventional twelve-inch monitors (that is, approximately twenty-five lines by eighty characters per line), but which has a viewing screen with a diagonal length of approximately one inch. Since the display screen 110 is located close to the operator's eye and is supported by the operator's head so it follows the operator's head movement, the operator is able to view information on the display screen 110 without having to move away from his work bench (where, for example, a device is being repaired) by merely glancing from the device being repaired to the display screen 110. Therefore, the display screen 110, as described above, facilitates the retrieval of information contained in an electronic database since such information can be viewed without significantly diverting an operator's attention away from his work.

Those having ordinary skill in the art will appreciate that the display screen 110 and display screen driver module 214 can be implemented using any video technology either available presently or in the future, such as color graphics adaptor (CGA), and enhanced graphics adaptor (EGA), video graphics array (VGA), and super VGA. According to a present embodiment, however, the display screen 110 and display screen driver module 214 are implemented using well-known monochrome and color Video Graphic Array (VGA) technology. VGA eyepiece monitors are available from Kopin of Taunton, MA, which produces and sells the AMLCD monitor. VGA eyepieces can operate using active thin film transistors (TFT) in a matrix providing color or monochrome computer display. Such devices are manufactured for the industry and are well known to those in the art. Also, VGA eyepiece monitors which operate according to well-known color shutter wheel technology are currently available from sources such as Nucolor™ Shutters produced by Tektronix, Inc. of Beaverton, Oreg. While the preferred display screen is a single screen positioned in front of the left or right eye, a binocular, head-mounted display (HMD) having two or more screens can be used. This can be immersive (all top and side vision obscured so that the user can only relate to the images on the screens) or as part of the user's vision so that the user can look over or under the displays. Such devices have utility in the new technology of virtual reality or where stereoscopic viewing is needed to relate to the displayed information. The display means may alternatively be a flat panel display screen attached to the system unit 106. Flat panels can include Field Emission Displays (FED) such as being produced by Silicon Video, Texas Instruments and Micron Technology in addition to the currently popular Liquid Crystal Display (LCD) and Thin Film Transistor (TFT) (active matrix) designs.

Figure 3:
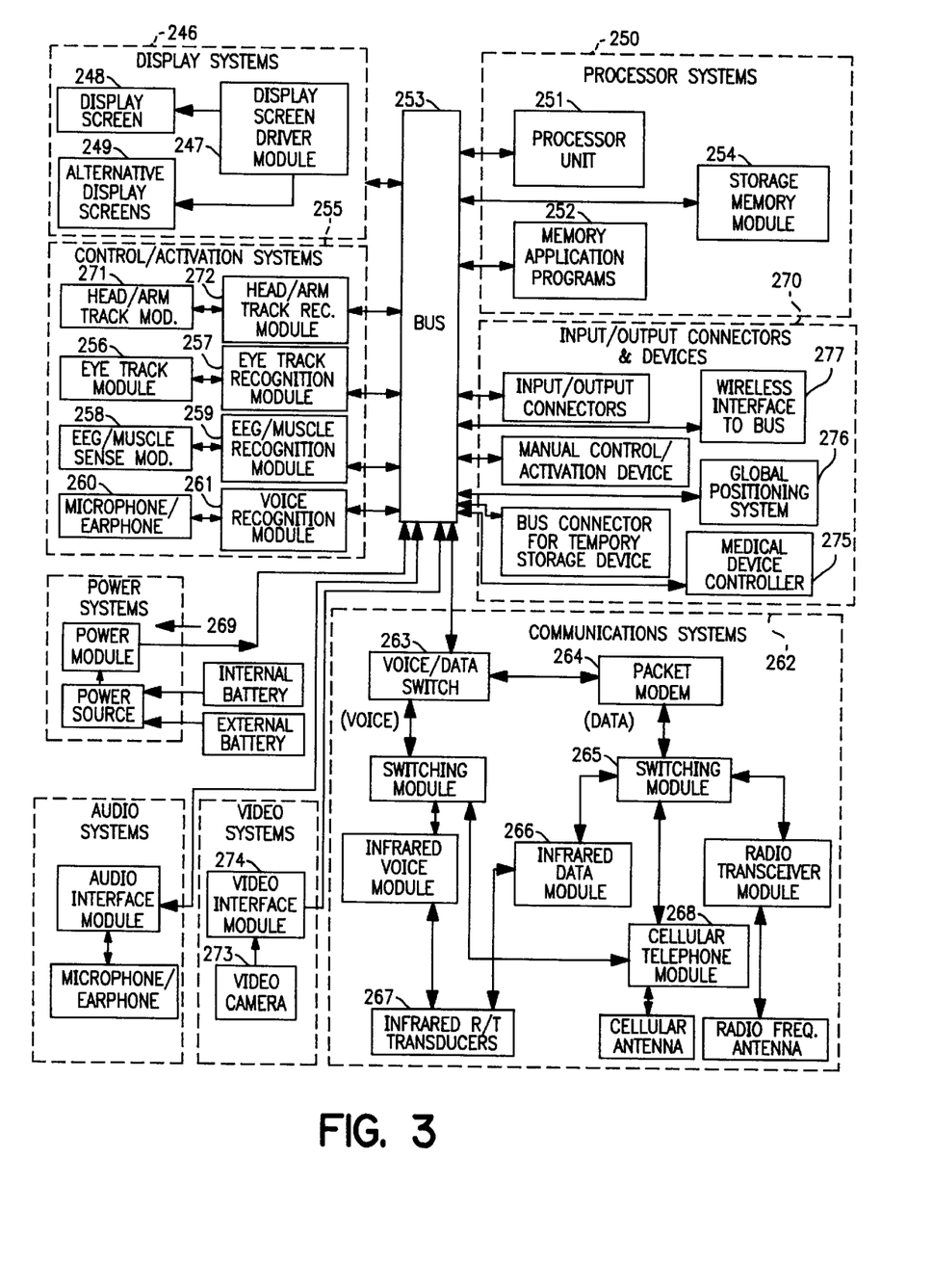
FIG. 3 is a schematic block diagram of the mobile computer of this invention showing the various activation means of this invention in contact with a remote host computer.

In FIG. 3 the block diagram contains the following:

In the box Display Systems 246

- the Display Screen Module 247 is a conventional VGA device drivers
- the Display Screen 248 is an active TFT (thin film transistor) display of about 1 square inch that is driven by a module available to those practicing the art
- the Alternative Display Screens 249, VGA or EGA color or monochrome CRT monitors that can be plugged into a standard 9 pin (DB9) receptacle. This allows the computer to be used in a standard desktop mode.

In the box Processor Systems 250

- the Processor Unit 251, the processor unit or central processing unit (CPU) is preferably an 80XXX series 16, 32 or 64 bit microprocessor available from Intel. Any other suitable processor can be use if desired.
- the Memory Box 252 can have up to thousands of Mbytes of Random Access Memory (RAM) and is connected to the BUS 253 and stores a program while the system is operating.
- the Storage Memory Module 254 is preferably contained in the system unit and is a static, read/write memory having a relatively large memory capacity such as a removable or non-removable hard disk drive bubble memory and read/write optical memory. In embodiments where the storage device 254 is removable, the system unit contains an external slot for allowing the operator to insert and remove removable storage disks. An optional storage device could be a read-only memory such as a CD-ROM. Preferably, the magnetic storage device includes 80 Mbytes to one gigabyte of memory. Magnetic storage devices which are suitable for use as the magnetic storage device and which have a size compatible with the size of the system unit are produced and sold by various manufacturers such as Integral, Connor, Seagate and Syquest. The magnetic storage device stores a database (which may be an ETM or IETM) which may have been previously loaded into the magnetic storage device from a floppy drive which could be connected to the computer via a port on the input/output connectors or from a remote computer via a telecommunication link connected to the computer via the packet switching component and the antenna or by direct cabling, and it contains stored programs as well.

In the box BUS 253

- BUS 253 is a parallel interconnecting bus of at least 16 bits in the present embodiment.

In the box Control Activation Systems 255

- the Eye Track Module 266 as described in this disclosure contains the low-light ccd sensing means and an IR illuminator
- Eye Tracking Recognition Module 257 contains those circuits that convert signals from the ccd sensing means into commands for the processor to activate cursor positioning and other commands as programmed. These circuits are as described in this disclosure and known by those versed in this art.
- the EEG/Muscle Module 258 contains sensing electrodes positioned on the head to sense changes in brain waves and electrical signals produced from muscle movement
- the EEG/Muscle Recognition Module 259 contains amplifier means and,conversion means that act to produce signals that the processor interprets as commands
- the Voice Recognition Module 261 contains processors that interpret electrical signals from the microphone and convert them to commands for the processor and processors that convert data streams from the processor into electrical signals that are converted to audible speech in the earphone. These circuits are known in the art as described in this application.

In the box Communications Systems 262

- Voice/Data Switch 263 contains circuits well known in the art that when commanded will switch a stream of electrical signals between two outputs. These commands are generated by the processor in response to a program controlling communication events
- the Packet Modem 264 contains a bi-directional modem modulator demodulator that converts digital data signals to a coded output signal capable of being transmitted over a relatively narrow bandpass signal channel (often PAM or pulse amplitude modulation). Further, the coded signal is segmented into packets or groupings of signals along with error checking capabilities that signal for a re-transmission of the packet, if not received in perfect condition. Circuits for this module are well known to anyone versed in the art.
- the Switching Module (Data) 265 is a data direction switch controlled by commands from the processor that determines a path for wireless transmission of data from the mobile computer.
- the Infrared Data Module 266 are circuits that receive digital data from the packet modem 264 and prepare electrical signals that will cause the infrared transducer 267 to radiate modulated infrared waves. Circuits such as this are well known in the art and are utilized in devices such as wireless connections between data collectors and processors and keyboards.
- the Cellular Telephone Module 268 is basically a cellular telephone designed to be connected to a portable computer. Devices containing these circuits are available at most stores that sell cellular telephones to include manufacturers such as Motorola.

Any known suitable power system 269 may be used with the system of the present invention.

Video Camera 273 contains a miniature video camera capable of high resolution output. The camera may be monochrome or color capable of producing conventional NTSC television signals or higher resolution scans as required by a specific application. Video Interface Module 274 contains circuits for video frame or motion capture, enhancement, compression and output to the computer Bus 253. The output will contain reference frame capture for transmission to the aforementioned Bus for storage every "X" frame interval (to be determined by the specific application being utilized). Optional direct video communication with intermittent captured frames is another option for still and motion video executing in sequence or in parallel. Such circuits as above are common to the art and available to the trade. Medical Device Controller 275 contains any one of many specialized medical devices designed to perform medical procedures or patient therapy. Such devices include muscle stimulators, bed positioning control, emergency call device and any of various medical units that would perform activities or sense and monitor a patient's bodily status and function for the patient in a hands-free environment. Global Positioning System 276 contains a receiver responsive to global positioning system satellites that determines latitude and longitude of the receiver by cross referencing signals from several satellite transmitters. GPS receivers are available in many sizes and form factors on the commercial market. Wireless Interface to Bus 277 contains optional wireless interface circuits that allow communication to the Bus separate from the main communications systems for special applications not compatible with the main communications systems.

The preferred and optimumly preferred embodiments of the present invention have been described herein and shown in the accompanying drawings to illustrate the underlying principles of the invention, but it is to be understood that numerous modifications and ramifications may be made without departing from the spirit and scope of this invention.

We claim:

1. A hands-free computer apparatus comprising in electrical connection:

a computer housing, a computer display means, hands-free activating means and securing means, said securing means used to attach at least said computer display means and said activating means to a user, said computer housing having mounted therein means for storing previously entered information, processor means in said housing and communicating with the storage means for receiving, retrieving and processing information and user commands in accordance with a stored program, transducer and converter means in communication with the processor means for receiving activation commands from the user, for converting said commands into electrical signals for recognizing the converted electrical signals and for sending the converted signals to said processor means, said processor means including means for recognizing a command in the converted electrical signals and responding to the recognized command by retrieving and outputting corresponding information from the storage means, said computer display means in communication with the processor means for receiving the outputted information from the processor means and for displaying the received information, and means for mounting the computer display means on the user such that the computer display means is carried hands-free in view of the user, and wherein the computing apparatus is capable of being operated to display the received information in a hands-free manner utilizing only hands-free activation commands, and means to provide a receptacle opening to the outside of the computer housing that is connected to an internal bus of the processor means, other internal computer components including the storage means are also communicating with the internal bus, a means for temporarily plugging an external storage device into the bus for transferring data between the internal storage device and the external storage device using only said activating means so as to permit hands-free operation of the computer during data transfer, and wherein said external storage device supplies additional information to said bus and has means for said additional information to cooperate with and supplement existing information and data already in said computing apparatus, while at the same time having means for retaining at least part of the existing information, and wherein said hands-free activating means is selected from the group consisting of audio activation means, eye-tracking activation means, electroencephalography activation means and mixtures thereof.

2. The computer apparatus of claim 1 wherein only said computer display means and said hands-free activating means are worn by the user and said computer housing is unattached from the user and located at a remote location.

3. The computer apparatus of claim 1 wherein said computer housing, said computer display means and said hands-free activating means are worn by the user.

4. The computer apparatus of claim 1 wherein said computer apparatus has means for interacting and communicating with a separate computer housing of a second separate mobile computer apparatus.

5. The computer apparatus of claim 1 wherein said computer apparatus has means for interacting and communicating with a separate computer display means of a second separate mobile computer apparatus.

6. The computer apparatus of claim 1 wherein said computer apparatus has means for communicating and interacting with a communication means selected from the group consisting of cellular telephones, hard line telephones, infra-red transceivers, two-way radio means and mixtures thereof.

7. The computer apparatus of claim 1 wherein said hands-free activating means includes a means for transmitting audio commands and a voice recognition module.

8. The computer apparatus of claim 1 wherein said hands-free activating means includes electroencephalography activation means, and activation means responsive to electrical signals from muscles in the head area, working in concert.

9. The computer apparatus of claim 1 wherein said previously entered information comprises a member selected from the group consisting of an electronic technical manual, interactive electronic technical manuals and mixtures thereof.

10. The computer apparatus of claim 1 wherein said hands-free activating means comprises means for recognizing a converted electrical signal from an eye-tracking device, said eye-tracking device comprising means for placing said eye-tracking device in visual contact with a user, means for determining the center of the user's eye pupil, means to determine a point on a display where the user is looking, said means to electrically transmit information obtained to said computer housing.

11. The computer apparatus of claim 1 wherein said hands-free activating means is selected from the group consisting of audio activation means, eye-tracking activation means, electroencephalography (EEG) activation means, and mixtures thereof acting in combination with head and arm tracking means to control computer output.

12. The computer apparatus of claim 1 wherein said hands-free activating means includes electroencephalography (EEG) activation means, and activation means responsible to electromyography (EMG) signals from muscles in the head area working in concert and acting in combination with head and arm tracking means to control computer output.

13. The computer apparatus of claim 1 wherein said hands-free activating means controls and/or receives input from a medical device such as a muscle stimulator under control of the computer user.

14. The computer apparatus of claim 1 wherein said recognizing means also includes means for defining positioning of an image within the display means responsive to electrical signals derived from the eye-tracking sensors and means to shift the viewing area of the display device to allow the user to scan over an image larger than the normal viewing area of the display device responsive to eye movement toward the extremities of the display device viewing area.

15. The computer apparatus of claim 1 wherein said computer housing, said computer display means and said activation means are combined into a single housing worn by the user.

16. A method for hands-free retrieval and display of information by a compact, body-supported portable computing apparatus comprising the steps of:

providing and utilizing a mobile hands-free computer comprising an activating means, a storage means and processor means that is carried hands-free by the user that has a computer display device mounted on the user allowing the user to observe an image provided by the computer in a hands-free manner, commanding the operation of the computer using hands-free activation commands that are translated into computer commands to allow operation without a conventional keyboard and in a hands-free manner only using said activation commands, providing a means for temporarily plugging an external storage device into the bus of the processor means to which the processor means is electrically connected, transferring data between the existing internal storage device and the external storage device using only said activation commands to actuate and control the transfer, and supplying via said external storage device additional information to said bus, while retaining information already in said internal storage device, said additional information supplied to cooperate with and supplement any existing information and data already in said body supported portable computing apparatus, and wherein said hands-free activating means is selected from the group consisting of audio activation means, eye-tracking activation means, electroencephalography activation means and mixtures thereof.

17. The computing method of claim 16 to include providing as said activating means eye tracking sensor means which are mounted adjacent to the eye of the user in a manner supported hands-free by the user, and tracking eye movements of the user's eye, converting the eye movements into electrical signals, sending the converted electrical signals to the computing apparatus as commands, said audio commands and eye movement commands working in concert to control the computing apparatus.

18. The computing method of claim 16 wherein said activating means includes means for sensing electrical and muscle changes in the head area of the user in a manner supported hands-free by the user and, converting these changes into electrical signals, and for sending the converted electrical signals to a processor means as activation commands, said activation commands generated from sensed electrical and muscle changes in the user working in concert to control the computing apparatus.

* * * * *

UNITED STATES PATENT AND TRADEMARK OFFICE
CERTIFICATE OF CORRECTION

PATENT NO. : 5,844,824
DATED : Dec. 1, 1998
INVENTOR(S) : Newman et al.

Page 1 of 2

It is certified that error appears in the above-identified patent and that said Letters Patent is hereby corrected as shown below:

The title page should be deleted to appear as per attached title page.

On the title page, Item [56],

Patent No. 5,844,824 please list the references of enclosed Exhibit II under "References Cited".

Signed and Sealed this

Sixth Day of July, 1999

Attest:

Q. TODD DICKINSON

*Attesting Officer*

Acting Commissioner of Patents and Trademarks

United States Patent [19]

Newman et al.

[11] Patent Number: 5,844,824
[45] Date of Patent: Dec. 1, 1998

[54] HANDS-FREE, PORTABLE COMPUTER AND SYSTEM

[75] Inventors: Edward G. Newman, Fairfax Station; Michael D. Jenkins, Manassas; Steven J. Schwartz, Fairfax, all of Va.

[73] Assignee: Xybernaut Corporation, Fairfax, Va.

[21] Appl. No.: 861,598

[22] Filed: May 22, 1997

Related U.S. Application Data

[63] Continuation of Ser. No. 538,194, Oct. 2, 1995, abandoned.
[51] Int. Cl.$^6$ ............................... G06F 1/00; G06F 3/00
[52] U.S. Cl. ............................... 364/708.1; 364/709.11
[58] Field of Search ............................... 364/708.1, 705.05, 364/709.11; 434/258; 128/731; 351/210

[56] References Cited

U.S. PATENT DOCUMENTS

| | | | |
|---|---|---|---|
| 4,013,068 | 3/1997 | Settle et al. | 600/545 |
| 4,387,296 | 6/1983 | Newell et al. | 235/376 |
| 4,973,149 | 11/1990 | Hutchinson | 351/210 |
| 5,155,615 | 10/1992 | Tagawa | 359/213 |
| 5,189,632 | 2/1993 | Paajanen et al. | 364/705.05 |
| 5,305,244 | 4/1994 | Newman et al. | 364/708.1 |
| 5,374,193 | 12/1994 | Trachtman | 434/258 |
| 5,426,769 | 6/1995 | Pawloski | 395/500 |
| 5,513,649 | 5/1996 | Gevins et al. | 128/731 |
| 5,584,010 | 12/1996 | Kawai et al. | 711/117 |
| 5,630,153 | 5/1997 | Intrater et al. | 395/800.35 |
| 5,649,061 | 7/1997 | Smyth | 395/20 |

OTHER PUBLICATIONS

Brochure on Introvoice VI, Voice Recognition and Synthesis by Voice Connexion, 1989.
Brochure on Micro Introvoice, Modular Voice Recognition and Synthesis System by Voice Connexion, 1990.
Brochure on VoiceScribe 1000 PLUS Speech Recognition System by Technology Systems Int'l, Inc., dated prior to March 27, 1991.
Department of Defense, Program Solicitation 90.1, FY-1990 Small Business Innovation Research (SBIR) Program, issue date October 1, 1989.
Integrated Audio-Video Headset Display Terminal (IAVHDT) for Maintenance Personnel, Final Report to U.S. Army Electronics Command by Imaging and Sensing Technology Corporation, March 27, 1991.
Article on "Private Eye" from Language Technology, March/April 1989.
Lee, "Reflection Ships Private Eye Head-Mounted Virtual Display," Infoworld, April 23, 1990.
Brochure on Hughes Portable Information Equipment, April 1990.
Murphey, "City Firm Introduces 'PC-In-A-Hat'", Spokane Spokesman Review, June 11, 1991.
Article entitled "Portable Unit Gives Visual and Audible Access to CD-ROM Data," Integrated Messaging News, April 1991, page 7.
Article entitled "CD-ROM is Coming into Focus for Consumers, It's still Optical Illusion," San Jose Mercury New, Sunday, March 24, 1991.
Brochure on "Heat Mounted Monitor", by GEC Avionics, Dec. 1989 (See attached Reexamination Certificate)
Brochure on "Micro Introvoice, Modular Voice Recognition and Synthesis System", by Voice Connexion, 1990.

*Primary Examiner*—Emmanuel L. Moise
*Attorney, Agent, or Firm*—James J. Ralabate

[57] ABSTRACT

The invention involves a body-worn, hands-free computer system. The system does not rely upon a keyboard input or activation apparatus but rather has various activation means all of which are hands-free. The system can be used with other systems, other system components and communication apparatus. Also, various components of the present system can be body worn or placed in a disconnected location if desired.

18 Claims, 3 Drawing Sheets